(12) United States Patent
Kiesewetter et al.

(10) Patent No.: US 10,486,794 B2
(45) Date of Patent: Nov. 26, 2019

(54) PROPELLER ASSEMBLY WITH AT LEAST TWO PROPELLER BLADES

(71) Applicant: AIRBUS HELICOPTERS DEUTSCHLAND GMBH, Donauworth (DE)

(72) Inventors: Uwe Kiesewetter, Rain am Lech (DE); Stefan Haisch, Harburg (DE); Marius Bebesel, Augsburg (DE); Sebastian Mores, Munich (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 581 days.

(21) Appl. No.: 15/471,236

(22) Filed: Mar. 28, 2017

(65) Prior Publication Data

US 2017/0297677 A1 Oct. 19, 2017

(30) Foreign Application Priority Data

Apr. 1, 2016 (EP) ..................................... 16400009

(51) Int. Cl.
*B64C 11/30* (2006.01)
*B64C 11/06* (2006.01)
*B64C 11/00* (2006.01)

(52) U.S. Cl.
CPC ............ *B64C 11/06* (2013.01); *B64C 11/008* (2013.01)

(58) Field of Classification Search
CPC combination set(s) only.
See application file for complete search history.

(56) References Cited

U.S. PATENT DOCUMENTS

| 2,614,637 A | 10/1952 | Landgraf | |
|---|---|---|---|
| 2,648,390 A * | 8/1953 | De Lagabbe | ........... B64C 11/30 416/147 |
| 2,684,122 A | 7/1954 | Perry | |

(Continued)

FOREIGN PATENT DOCUMENTS

| CA | 2316418 | 2/2001 |
|---|---|---|
| DE | 962571 | 4/1957 |

(Continued)

OTHER PUBLICATIONS

Extended European Search Report for European Application No. EP 16400009.3, Completed by the European Patent Office, dated Aug. 26, 2016, 7 Pages.

*Primary Examiner* — George C Jin
*Assistant Examiner* — Teuta B Holbrook
(74) *Attorney, Agent, or Firm* — Brooks Kushman P.C.

(57) ABSTRACT

A propeller assembly with at least two propeller blades that are interconnected by associated connection means, the associated connection means defining a common pitch axis for the at least two propeller blades in operation, each one of the at least two propeller blades comprising associated leading and trailing edges that define a respective chord and quarter chord line thereof, wherein the common pitch axis is arranged with a predetermined offset relative to the quarter chord line of each one of the at least two propeller blades, and wherein the associated connection means is adapted to enable, at least in operation in a non-axial inflow field, a passive pitch adjustment of the at least two propeller blades around the common pitch axis.

14 Claims, 8 Drawing Sheets

(56) References Cited

U.S. PATENT DOCUMENTS

| | | | |
|---|---|---|---|
| 2,724,446 A | 11/1955 | Hill | |
| 3,292,710 A * | 12/1966 | Grut | B64C 11/30 416/153 |
| 3,999,886 A * | 12/1976 | Ormiston | B64C 27/33 416/104 |
| 4,130,377 A * | 12/1978 | Blackwell, Jr. | B64C 27/463 416/132 R |
| 4,619,585 A * | 10/1986 | Storm | F03D 7/06 416/119 |
| 4,730,795 A * | 3/1988 | David | B64C 27/22 244/17.21 |
| 4,789,305 A * | 12/1988 | Vaughen | B64C 27/46 416/114 |
| 5,181,678 A * | 1/1993 | Widnall | B64C 3/48 244/219 |
| 5,306,119 A * | 4/1994 | Bandoh | B64C 11/00 415/119 |
| 5,879,131 A * | 3/1999 | Arlton | B64C 27/10 416/132 A |
| 6,234,422 B1 * | 5/2001 | Bolonkin | B64C 27/026 244/17.11 |
| 6,264,136 B1 * | 7/2001 | Weston | B64C 3/385 244/48 |
| 7,530,785 B1 * | 5/2009 | Deering | F03D 1/0658 416/1 |
| 8,075,269 B2 * | 12/2011 | Brindejonc | B64C 27/605 416/104 |
| 8,177,508 B2 * | 5/2012 | Berthie | B64C 27/605 416/104 |
| 2012/0263590 A1 * | 10/2012 | Mercier Des Rochettes | B64C 27/473 416/1 |
| 2015/0210378 A1 * | 7/2015 | Embacher | B64C 5/16 244/17.11 |
| 2017/0183090 A1 * | 6/2017 | Alber | B64C 11/18 |
| 2018/0002008 A1 * | 1/2018 | Muren | A63H 27/12 |
| 2018/0362153 A1 * | 12/2018 | Paulson | B64C 27/82 |

FOREIGN PATENT DOCUMENTS

| | | |
|---|---|---|
| FR | 932973 | 4/1948 |
| WO | 2014160526 | 10/2014 |

\* cited by examiner

PROPELLER ASSEMBLY WITH AT LEAST TWO PROPELLER BLADES

CROSS-REFERENCE TO RELATED APPLICATIONS

This application claims priority to European patent application No. EP 16400009.3 filed on Apr. 1, 2016, the disclosure of which is incorporated in its entirety by reference herein.

BACKGROUND OF THE INVENTION

(1) Field of the Invention

The invention is related to a propeller assembly with at least two propeller blades that are interconnected by associated connection means, the associated connection means defining a common pitch axis for the at least two propeller blades in operation, each one of the at least two propeller blades comprising associated leading and trailing edges that define a respective chord and quarter chord line thereof, the propeller assembly comprising the features of claim 1. The invention is further related to an aircraft comprising such a propeller assembly, the aircraft comprising the features of claim 14.

(2) Description of Related Art

Propeller assemblies are usually embodied as so-called fixed pitch propellers, i. e. propellers with propeller blades that are not rotatable around their respective longitudinal axes for pitch adjustment. These fixed pitch propellers generate a uniform lift distribution over their associated propeller planes as long as they are operated in an axial air inflow field. Such an axial air inflow field, which is hereinafter also referred to as an "axial inflow field" for simplicity, generally occurs during hover conditions of a given aircraft.

However, during forward flight conditions of the given aircraft, the fixed pitch propellers are not generating a uniform lift distribution over their associated propeller planes and, instead, produce an inadequate amount of drag in comparatively great parts of their associated propeller planes, as the air enters the propeller planes non-axially. In other words, during forward flight conditions the fixed pitch propellers are operated in a non-axial air inflow field that is hereinafter also referred to as a "non-axial inflow field" for simplicity, which leads to the inadequate amount of drag and results in a comparatively high amount of power necessary to propel the given aircraft.

For instance, if an essentially vertically mounted fixed pitch propeller with two diametrically opposed propeller blades is operated in a non-axial inflow field, e. g. during forward flight conditions, a respectively advancing blade will generate a significant amount of lift, drag and pitching moment, while a respectively retreating blade will also generate a significant amount of drag, but only a comparatively low amount of lift and pitching moment due to an underlying fixed propeller pitch angle thereof. More specifically, an airfoil of a propeller blade is usually described by a chord c, which defines the distance from a respective leading edge to a respective trailing edge of the propeller blade. In order to describe aerodynamic forces and moments acting on a given airfoil, commonly a so-called c/4-point of the airfoil departing from the leading edge is used. In this c/4-point, lift, drag and pitching moment act on the given airfoil and, thus, all aerodynamic parameters are given at this point. Therefore, the c/4-point is nomenclated as "airfoil reference point", which defines a so-called c/4-line, i. e. quarter chord line along a span of the propeller blade and which is used to allow comparison of a large range of varieties of airfoils to each other. This also applies to the above described example, where the advancing blade acting as an airfoil produces the high lift, high drag and high pitching moment at its associated quarter chord line, whereas the retreating blade generates the low lift, high drag and low pitching moment at its associated quarter chord line.

As a result, an associated force distribution between the opposed propeller blades is not balanced, neither in forces, nor in moments. This additionally creates a comparatively large amount of blade root momentum, which is unfavorable for a respective propeller blade design. In summary, as conventional fixed pitch propellers do not have any pitch adjustment means, their lift and drag distribution in operation is very unfavorable.

This problem can be avoided by the application of articulated rotor assemblies with rotor blades, wherein each rotor blade is articulated and controlled individually over its azimuth angle of rotation. This is generally known as cyclic pitch actuation, which is implemented in current Vertical Take-Off and Landing aircrafts and which generally requires complex, heavy and cost intensive pitch adjustment devices that are necessary to adjust each rotor blade individually by actively actuating each rotor blade.

More specifically, articulated rotor assemblies are actively actuated rotor assemblies that are usually not only provided with cyclic, but also with collective pitch adjustment devices in order to be effective regarding lift and drag. Thus, a homogeneous lift distribution over the azimuth angle of rotation of the rotor assemblies can be achieved even during operation in non-axial inflow fields. The azimuth angle is defined with respect to a respectively advancing rotor blade as being 0° for an aft most position of the rotor blade and being 90° on a respective advancing blade side. However, the cyclic and collective pitch adjustment devices are generally embodied as active actuation means with a comparatively great complexity and weight and require the implementation of cost-intensive, complex controlling mechanisms and surveillance means.

The document U.S. Pat. No. 2,614,637 describes a rotor assembly of a helicopter that is provided with an automatic rotor pitch adjustment mechanism on the basis of throttle setting and power, i. e. rotational speed of the rotor assembly in operation. More specifically, the rotor assembly comprises a plurality of rotor blades, each one being attached to an associated stub shaft that is angularly adjustable in a hub structure of the helicopter for pitch variation. The hub structure is joined to a vertically extending hollow shaft that is rotated in operation by an appropriate source of power of the helicopter. Each one of the rotor blades is connected via an associated arm to a collar that is actively moveable by means of a resilient force applied thereto, as well as to a counterweight via a bell crank lever, which is moveable by means of centrifugal forces acting on the counterweight in operation. Accordingly, the pitch of each one of the rotor blades is adjusted automatically in operation and independent of the pitch of all other rotor blades. Thus, the rotor assembly is suitable to react positively on sudden variations of incoming wind or RPM and to counteract by de-/increasing the blades' angles of incident.

However, due to the required arms, collars, levers and counterweights, this automatic rotor pitch adjustment mechanism is comparatively complex, heavy and cost intensive. Furthermore, there is no transfer of forces and moments between opposed rotor blades of the rotor assembly.

The document WO2014160526 describes a passive rotor control mechanism for micro air vehicles. More specifically, an under-actuated passive mechanism is described that is adapted for maintaining lifting thrust of such an air vehicle by regulating an average rotor speed and by generating control moments through coordinated pulsing of motor torque. Rapid pulsing of the motor torque induces oscillations in the rotor blades' angle of attack, and so causes "cyclic control" without requiring conventional auxiliary actuators and linkages. In other words, pitch adjustment is performed by means of a system that actively controls relative motion of associated, separately mounted rotor blades via actuators by means of a pulsing control that is linked with the motor torque. Therefore, this actively controlling system is at least provided with a processor and a memory.

However, due to the required processor and memory, this actively controlling system is comparatively complex and complicated. Furthermore, there is no transfer of forces and moments between opposed rotor blades of the rotor assembly.

Furthermore, it should be noted that RC helicopters, i. e. radio-controlled model helicopters, are also well-known to the person skilled in the art. Such RC helicopters frequently comprise an upper and a lower rotor plane, each one comprising two, in operation diametrically opposed rotor blades. The upper rotor plane is further provided with two diametrically opposed weight arms that are arranged in an angle of approximately 30° to 50° with respect to the associated diametrically opposed rotor blades and provided with respective weights at their free ends. Furthermore, the diametrically opposed rotor blades are hinged and connected to the weight arms, and both, the diametrically opposed rotor blades and the diametrically opposed weight arms are separately hinged and connected to a rotor shaft of a given RC helicopter. In operation of the given RC helicopter, the weight arms are rotated around the rotor shaft for properly adjusting the orientation of the upper rotor plane relative to the rotor shaft via the hinged connection for stabilization purposes. In other words, the weight arms are controlling orientation and pitch of the rotor blades of the upper rotor plane and naturally stabilizing the latter.

However, the construction of the upper rotor plane with the diametrically opposed rotor blades and the diametrically opposed weight arms is still comparatively complex, as it requires a plurality of hinges for the separate hinged connection of all these components to each other and to the rotor shaft. Consequently, a comparatively great number of separate components is required.

The document DE962571 describes a device for stabilization of articulated rotors for helicopters, absorbing instability mainly during flight without forward speed or with little forward speed. A universal joint articulation is provided between the rotor mast and the articulated rotor. The blades are hinged by arms at the quarter chord line, rotatable in hubs of the universal joint articulation. Also, rigid struts angularly distinct from the span direction of the blades are attached to the universal joint articulation. At outer radial ends of each rigid strut is a ball joint that carries a stabilizing mass. Each ball joint and the corresponding stabilizing mass is connected by a movable and flexible strut. The flexible strut has either the form of a metal string, a chain, a shaft drive or ball joint or another articulation. During operation, the stabilizing masses tend to maintain their own rotational plane. So, when the articulated rotor tilts, the stabilizing masses follows with delay the inclination. This produces two stabilizing forces upon the rigid struts that impose a change in slope around the quarter chord line of the blades.

The document FR932973 describes a rotor automatic control device for a helicopter. The blades are rigidly attached to an annular outer hub. The annular outer hub is articulated on an inner ring via aligned axes orthogonal to the quarter chord line of the blades. At the top end of the rotor mast, an inner ring is mounted via a transverse axis for relative rotatable connection. The annular outer hub holding the blades is therefore free to be inclined relatively to the rotor mast. An abutment is provided at the top of the control device below the outer hub and a corresponding blade. When the abutment reaches upwards to the outer hub, the resulting contact creates a force that bends the outer hub around the aligned axes. This moves the rotational plane of the hub holding the blades through a corresponding inclination. The blades thus are self-balanced with respect to the whole helicopter, so as to limit stresses in the rotor mast and in the blades.

Other documents were considered, i.e. CA2316418 U.S. Pat. Nos. 2,684,122 and 2,724,446.

BRIEF SUMMARY OF THE INVENTION

It is, therefore, a first object of the present invention to provide a new propeller assembly with at least two propeller blades that is adapted for generating an improved lift and drag distribution, especially during operation in a non-axial inflow field, and that comprises a simplified construction compared to conventional articulated rotor assemblies. It is a second object of the present invention to provide an aircraft comprising a new propeller assembly with at least two propeller blades that is adapted for generating an improved lift and drag distribution, especially during operation in a non-axial inflow field, and that comprises a simplified construction compared to conventional articulated rotor assemblies.

The first object is solved by a propeller assembly with at least two propeller blades, the propeller assembly comprising the features of independent claim 1. The second object is solved by an aircraft comprising such a propeller assembly according to independent claim 14.

It should be noted that although the present invention is described above with reference to a propeller assembly having at least two propeller blades, the teachings of the present invention likewise apply to a rotor assembly having at least two rotor blades. Consequently, any reference to propeller assemblies or to propeller blades and/or airfoils in the present description should likewise be understood as a reference to rotor assemblies or to rotor blades and/or airfoils, so that the inventive aircraft with an inventive propeller assembly can likewise be implemented as an aircraft with a rotor assembly. Moreover, the teachings of the present invention cannot only likewise be applied to rotor blades, but more generally to any other aerodynamic lifting surfaces, as commonly used in remote controlled aerial vehicle toys, drones, etc., which rather use simple twisted/bent sheet material as lifting surfaces.

More specifically, the inventive propeller assembly comprises at least two propeller blades that are interconnected by associated connection means. The associated connection means define a common pitch axis for the at least two propeller blades in operation. Each one of the at least two propeller blades comprises associated leading and trailing edges that define a respective chord and quarter chord line thereof. The common pitch axis is arranged with a predetermined offset relative to the quarter chord line of each one of the at least two propeller blades. The associated connection means is adapted to enable, at least in operation in a non-axial inflow field, a passive pitch adjustment of the at least two propeller blades around the common pitch axis in response to aerodynamic forces acting on the at least two propeller blades.

According to one aspect of the present invention, the associated connection means allows to transfer a moment from a respectively advancing blade of the at least two propeller blades to a respectively retreating blade of the at least two propeller blades, in order to increase lift that is generated by the propeller assembly, and in order to homogenize an underlying generated lift distribution. A respective connecting axis, in which the moment is transferred, is preferably located upstream of each blade's quarter chord line, i. e. in a region between its quarter chord line and its leading edge, in order to produce an additional momentum next to the blade's quarter chord line moment, which would result from a rotation around the quarter chord line.

More specifically, the inventive propeller assembly allows for an adjustment of a respective pitch angle of a rotating propeller blade depending on its azimuth angle. Preferably, depending on the azimuth angle, each propeller blade exhibits an individual pitch angle in order to provide adequate aerodynamic lift. More generally, the inventive propeller assembly comprises a passive, hence automatic, cyclic pitch adjustment in order to beneficially distribute generated lift and drag on the propeller assemblies rotating plane during operation in a non-axial inflow field, such as e. g. during forward flight conditions of an aircraft. Consequently, the inventive propeller assembly relinquishes on any active means of actuation, meaning that the cyclic pitch adjustment of each propeller is performed automatically by aerodynamic effects and not by an associated mechanical active actuation means.

According to one aspect of the present invention, the inventive propeller assembly generates less drag, thus, leads to a reduced overall power consumption. Furthermore, corresponding loads on the propeller blades are reduced without requiring active actuation means. Moreover, the relinquishment of active actuation and/or articulation means leads to a simplified design with a reduced number of required implementing components. Additionally, a respective flapping moment of the propeller blades which are subjected to a non-axial inflow field can be minimized, due to a beneficial balancing of forces and moments. Finally, by implementing the passive cyclic pitch adjustment according to the present invention, the pitch attitude of the propeller blades is efficiently actuated by occurring aerodynamic forces without any active actuation and/or articulation means. Thus, an underlying lift distribution over the propeller plane, in a non-axial inflow field, is re-distributed beneficially since a respectively advancing blade, having a higher pitching moment, acts on a respectively retreating blade, in order to increase lift. Depending on the installation angle of the blade relative to the associated connection means and/or a given rotor shaft, it will also reduce generated drag.

Advantageously, implementing the passive cyclic pitch adjustment allows to reduce the overall weight of an underlying aircraft, as a corresponding passive cyclic pitch adjustment system is lighter than an actively actuated pitch adjustment system, as it requires fewer constituent components and is less complex. This will also reduce a respectively required manufacturing time, costs and maintenance effort.

However, it should be noted that a main benefit of the present invention is considered as being an obtainable significant power reduction compared to the power that is required for operating a conventional fixed pitch propeller. This is particularly advantageous in multi-propeller vehicles. In particular, this leads to an increased endurance, increased power availability, reduced acoustic emission and reduced loads during operation in non-axial inflow fields.

According to a preferred embodiment, the passive pitch adjustment is adapted to homogenize at least approximately an underlying lift distribution generated by the at least two propeller blades in operation.

According to a further preferred embodiment, the common pitch axis is arranged at least approximately in parallel to the quarter chord line of each one of the at least two propeller blades.

According to a further preferred embodiment, the common pitch axis is arranged in a region defined between the leading edge and the quarter chord line of each one of the at least two propeller blades.

According to a further preferred embodiment, the common pitch axis is arranged with a predetermined height offset relative to a height position of the quarter chord line of each one of the at least two propeller blades.

According to a further preferred embodiment, a pitching moment transfer device is provided, the pitching moment transfer device being adapted to transfer a pitching moment generated on one of the at least two propeller blades during the passive pitch adjustment in operation to the other one of the at least two propeller blades.

According to a further preferred embodiment, the pitching moment transfer device defines a rigid link between the at least two propeller blades.

According to a further preferred embodiment, the pitching moment transfer device comprises at least one plate-shaped support that is rigidly mounted to each one of the at least two propeller blades.

According to a further preferred embodiment, the passive pitch adjustment of the at least two propeller blades in operation is achieved by a rotation of the at least two propeller blades around the common pitch axis, wherein associated rotation damping means are provided for damping the rotation of the at least two propeller blades around the common pitch axis.

According to a further preferred embodiment, the associated rotation damping means comprises at least one of bell hiller weights and aerodynamic paddles.

According to a further preferred embodiment, the associated connection means are mounted in a rotatable manner to an associated propeller mast.

According to a further preferred embodiment, bearings are provided for mounting the associated connection means to the associated propeller mast.

According to a further preferred embodiment, the predetermined offset of the common pitch axis relative to the quarter chord line of each one of the at least two propeller blades defines an offset angle.

According to a further preferred embodiment, the associated connection means are adapted for interconnecting at least four propeller blades. However, it should be noted that the associated connection means can alternatively be used in a coaxial propeller layout.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
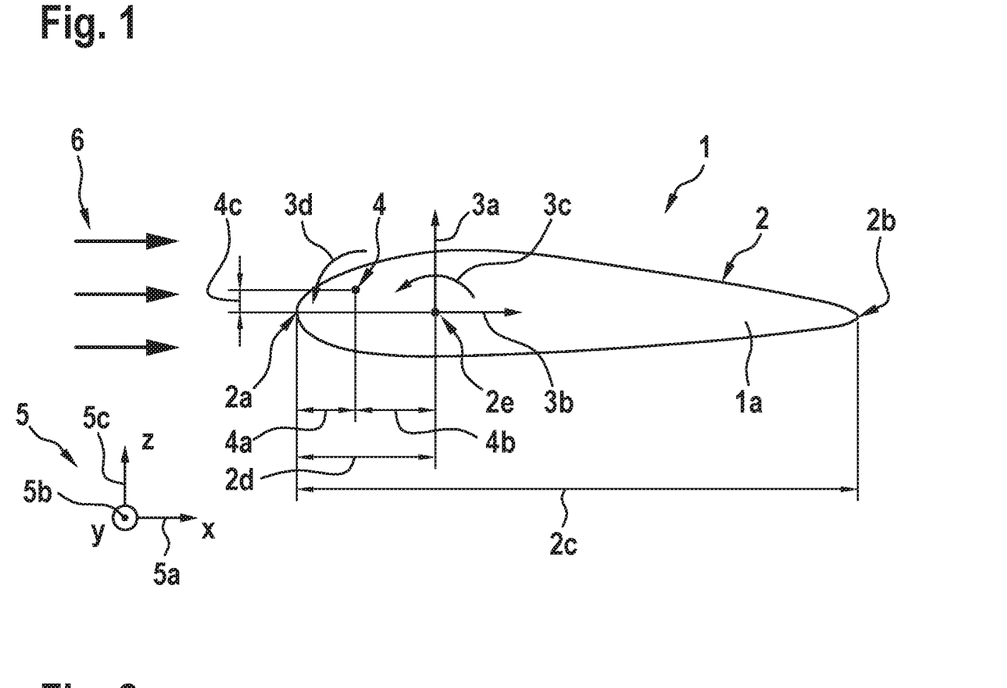
FIG. 1 shows a sectional view of a propeller blade in a non-axial inflow field.

FIG. 1 shows a propeller blade 1 of a propeller assembly (7 in FIG. 2) according to an aspect of the present invention. The propeller blade 1 exemplarily defines an advancing blade 1a in a non-axial inflow field and comprises an airfoil 2. The latter is illustrated with respect to an airfoil coordinate system 5 with an exemplary x-axis 5a, y-axis 5b and z-axis 5c.

The airfoil 2 is defined by a chord 2c, which is defined by a distance between a leading edge 2a and a trailing edge 2b of the propeller blade 1, and by a quarter chord line 2e, which is located at a quarter chord distance 2d from the leading edge 2a that amounts to a quarter of the chord 2c. In the illustrated, two-dimensional cross section of the propeller blade 1, the quarter chord line 2e merely defines a point, while it defines a line that runs along the y-axis 5b in the three-dimensional propeller blade 1.

More specifically, the quarter chord line 2e defines a reference line or point for lift 3a, drag 3b and a moment 3c that are generated by the propeller blade 1 at the quarter chord line 2e in operation. Generally, the lift 3a, drag 3b and moment 3c at the quarter chord line 2e represent reference parameters that are used to allow comparison of different airfoils with each other. For simplicity, the lift 3a at the quarter chord line 2e is hereinafter also referred to as the lift L, the drag 3b at the quarter chord line 2e is also referred to as the drag D and the moment 3c at the quarter chord line 2e is also referred to as the moment Mc/4. This moment Mc/4 defines a pitching moment that is illustratively shown as a closing moment, which pushes the leading edge 2a of the advancing blade 1a during operation in the non-axial inflow field 6 around the y-axis 5b downward in negative z-direction along the z-axis 5c.

It should be noted that the pitching moment Mc/4 is exemplarily illustrated and described as a closing moment, but may alternatively also be an opening moment that pushes the leading edge 2a of the advancing blade 1a during operation in the non-axial inflow field 6 around the y-axis 5b upwards in positive z-direction along the z-axis 5c. It should further be noted that in the context of the present application, any illustrated and described direction of forces and moments can also respectively be inverted. In particular, the lift L, the drag D and the moment Mc/4 are forces and moments, which are generated in operation of the propeller blade 1 on the basis of an underlying shaping of the airfoil 2 as a result of the blade's behavior in response to the non-axial inflow field 6.

According to one aspect, a pitch axis 4 of the propeller blade 1, i. e. the advancing blade 1a, is defined affront of the quarter chord line 2e in order to produce an additional pitching moment. Illustratively, the pitch axis 4 is arranged with a predetermined offset 4b in x-direction relative to the quarter chord line 2e. The offset 4b is, therefore, hereinafter also referred to as the horizontal offset Ox.

With respect to the leading edge 2a of the advancing blade 1a, the pitch axis 4 is arranged at a distance 4a therefrom in direction of the quarter chord line 2e, so that the quarter chord distance 2d is defined as the sum of the distance 4a and the offset 4b. Preferably, the distance 4a is smaller than the quarter chord distance 2d. Furthermore, an offset 4c in z-direction between the pitch axis 4 and the quarter chord line 2e is illustrated, which is hereinafter referred to as the vertical offset Oz.

By locating the pitch axis 4 as described above, generation of an increased overall resulting pitching moment 3d, which is hereinafter also referred to as the resulting pitching moment Mr, can be achieved. This resulting pitching moment Mr amounts to $Mr=Mc/4+L*Ox+D*Oz$. In the case that the vertical offset is reduced to zero, i. e. $Oz=0$, the resulting pitching moment Mr only amounts to $Mr=Mc/4+L*Ox$. Likewise, in the case that the horizontal offset is reduced to zero, i. e. $Ox=0$, the resulting pitching moment Mr only amounts to $Mr=Mc/4+D*Oz$. However, it should be noted that preferably at least one of Ox and Oz is unequal to zero, i. e. $Ox \neq 0$ or $Oz \neq 0$, and that any one of Mc, L, D, Ox and Oz may comprise positive or negative values.

Figure 2:
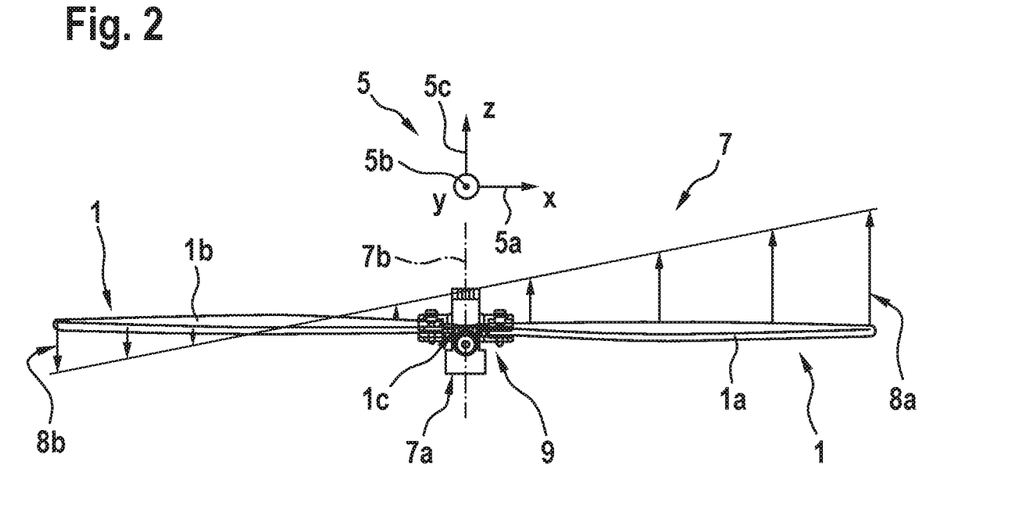
FIG. 2 shows a front view of a propeller assembly with two propeller blades.

FIG. 2 shows a propeller assembly 7 with two propeller blades 1, wherein one of the propeller blades 1 is illustrated as the advancing propeller blade 1a of FIG. 1, while another one is illustrated as a retreating blade 1b. More specifically, according to one aspect the propeller assembly 7 comprises at least two propeller blades 1, i. e. at least the advancing and retreating blades 1a, 1b, which are preferably interconnected by associated connection means 1c. According to one aspect, the propeller assembly is further provided with at least one pitching moment transfer device 9.

Preferably, the advancing and retreating blades 1a, 1b are connected via the associated connection means 1c to a propeller mast 7a. The latter illustratively defines a rotation axis 7b, which exemplarily corresponds to the z-axis of the coordinated system 5 of FIG. 1.

Illustratively, the propeller assembly 7 is shown with a lift distribution 8a from the advancing blade 1a and a lift distribution 8b from the retreating blade 1b. The lift distributions 8a, 8b are assumed to be generated in the non-axial inflow field 6 of FIG. 1. However, as can easily be seen, the lift distributions 8a, 8b are inhomogeneous, i. e. the lift distribution 8a is greater than the lift distribution 8b, as they are illustratively represented for a fixed pitch propeller configuration with two propeller blades, wherein the two blades are not interconnected with the associated connection means 1c, and which is not provided with the pitching moment transfer device 9. In other words, the associated connection means 1c and/or the pitching moment transfer device 9 are provided according to the present invention for homogenizing the lift distributions 8a, 8b, as described hereinafter with reference to FIG. 3.

Figure 3:
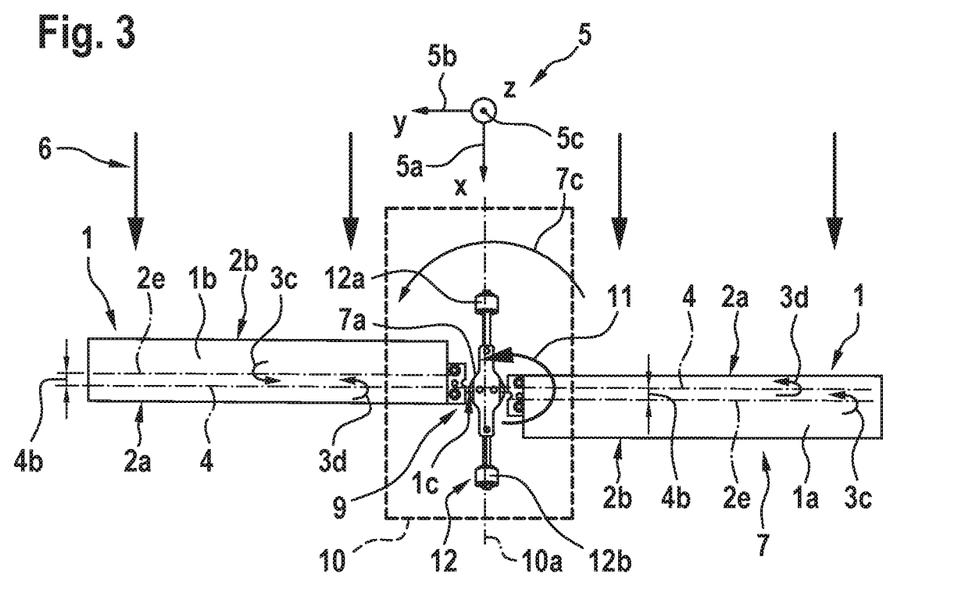
FIG. 3 shows a top view of the propeller assembly of FIG. 2 with rotation damping means in a non-axial inflow field.

FIG. 3 shows the propeller assembly 7 of FIG. 2 with the associated connection means 1c that defines the pitch axis 4 of FIG. 1, which is preferentially common to the advancing and retreating blades 1a, 1b and, therefore, hereinafter also referred to as the common pitch axis 4 for the advancing and retreating blades 1a, 1b in operation, i. e. during rotation in a rotation direction 7c around the propeller mast 7a of FIG. 2. The associated connection means 1c is preferably mounted in a rotatable manner to the propeller mast 7a of FIG. 2.

It should be noted that the terminology "advancing" and "retreating" blades 1a, 1b refers to the illustrated operation state of the blades 1a, 1b. More specifically, in the illustrated example, the propeller blade 1a advances towards the illustrated non-axial inflow field 6, i. e. advances against a streaming direction thereof, and is therefore referred to as the "advancing" blade 1a, while the propeller blade 1b retreats from the illustrated non-axial inflow field 6, i. e. moves in the streaming direction thereof, and is therefore referred to as the "retreating" blade 1a. In other words, each one of the propeller blades 1a, 1b periodically defines the advancing blade or the retreating blade and only for simplicity and clarity of the description, only the blade 1a is referred to as the advancing blade while the blade 1b is referred to as the retreating blade.

Preferably, the advancing and retreating blades 1a, 1b have at least a similar and, preferentially, an at least essentially corresponding configuration. In the illustrated example, the retreating blade 1b preferentially comprises the configuration of the advancing blade 1a as described above with reference to FIG. 1. In other words, each one of the advancing and retreating blades 1a, 1b comprises associated leading and trailing edges 2a, 2b that define a respective chord 2c and quarter chord line 2e thereof.

As described above with reference to FIG. 1, the common pitch axis 4 is arranged with the predetermined offsets 4b, 4c relative to the quarter chord line 2e of each one of the advancing and retreating blades 1a, 1b. Illustratively, the common pitch axis 4 is arranged at least approximately in parallel to the quarter chord line 2e of each one of the advancing and retreating blades 1a, 1b, preferably in a region defined between the leading edge 2a and the quarter chord line 2e of each one of the advancing and retreating blades 1a, 1b. Furthermore, the common pitch axis 4 is preferably arranged with a predetermined height offset, i. e. the vertical offset Oz of FIG. 1, relative to a height position of the quarter chord line 2e of each one of the advancing and retreating blades 1a, 1b.

However, it should be noted that the above described configuration is merely described by way of example and not for limiting the invention accordingly. More specifically, instead of arranging the common pitch axis 4 at least approximately in parallel to the quarter chord line 2e of each one of the advancing and retreating blades 1a, 1b, configurations are realizable wherein a kind of a curved quarter chord line as well as a curved leading and trailing edges are provided, which normally is described as a sweep, forward or backward, such as e. g. implemented in a so-called Blue-Edge Blade. In this case, a respective distance between the common pitch axis 4 and the quarter chord line 2e of each one of the advancing and retreating blades 1a, 1b would vary over a longitudinal extension of the blades 1a, 1b.

According to one aspect, the associated connection means 1c is adapted to enable, at least in operation in the non-axial inflow field 6 of FIG. 1, a passive pitch adjustment of the advancing and retreating blades 1a, 1b around the common pitch axis in response to aerodynamic forces acting on the advancing and retreating blades 1a, 1b. Preferably, the passive pitch adjustment is at least adapted to homogenize at least approximately an underlying lift distribution generated by the advancing and retreating blades 1a, 1b in operation in the non-axial inflow field 6 of FIG. 1.

More specifically, as the advancing and retreating blades 1a, 1b are preferentially at least essentially diametrically opposed to each other, the advancing blade 1a would conventionally, i. e. in the case of a fixed pitch propeller configuration, generate more lift distribution in the non-axial inflow field 6 than the retreating blade 1b, as illustrated in FIG. 2. Thus, according to one aspect of the present invention the resulting pitching moment Mr (3d in FIG. 1) of the advancing blade 1a would rotate about the common pitch axis 4 and be transferred to the retreating blade 1b via the pitching moment transfer device 9.

In other words, the pitching moment transfer device 9 is adapted to transfer the pitching moment Mr generated on the advancing blade 1a during the passive pitch adjustment in operation to the retreating blade 1b. However, the pitching moment transfer device 9 will preferentially not only transfer the resulting pitching moment Mr between the advancing and retreating blades 1a, 1b, but furthermore also any bending and lead lag moments.

As a result, the transferred resulting pitching moment Mr acts on the retreating blade 1b and increases the angle of attack (15a in FIG. 6) of the retreating blade 1b in order to produce more lift L. Therefore, the transferred resulting pitching moment Mr must be higher in magnitude than a pitching moment 3c that is generated by the retreating blade 1b at its quarter chord line 2e in operation. Furthermore, while the angle of attack of the retreating blade 1b is increased due to the transferred resulting pitching moment Mr, the angle of attack (15b in FIG. 6) of the advancing blade 1a will be decreased, thus, resulting in a passive pitch adjustment of the advancing and retreating blades 1a, 1b, which is exemplarily illustrated by a cumulated pitch rotation 11 of the advancing and retreating blades 1a, 1b around the common pitch axis 4.

According to one aspect, as the passive pitch adjustment of the advancing and retreating blades 1a, 1b in operation is achieved by the rotation of the advancing and retreating blades 1a, 1b around the common pitch axis 4, associated rotation damping means 12 are provided for damping vibration occurring during this rotation. Illustratively, the associated rotation damping means 12 comprises at least two, preferably diametrically opposed bell hiller weights 12a, 12b. These bell hiller weights 12a, 12b are preferably arranged at an angle in a range from 60° to 90° with respect to the common pitch axis 4, and illustratively at an angle of 90°.

It should be noted that the associated rotation damping means 12 are adapted to provide for a supplementary stabilization of the propeller assembly 7 in operation. However, they are nevertheless merely optional, as a safe and reliable functioning of the propeller assembly 7 can already be obtained with the associated rotation damping means 12.

By way of example, the propeller assembly 7 is shown as being mounted to an aircraft 10 having a longitudinal axis 10a. The aircraft 10 is preferably a rotary wing aircraft, preferentially a multi-propeller aircraft, such as a quadcopter.

Figure 4:
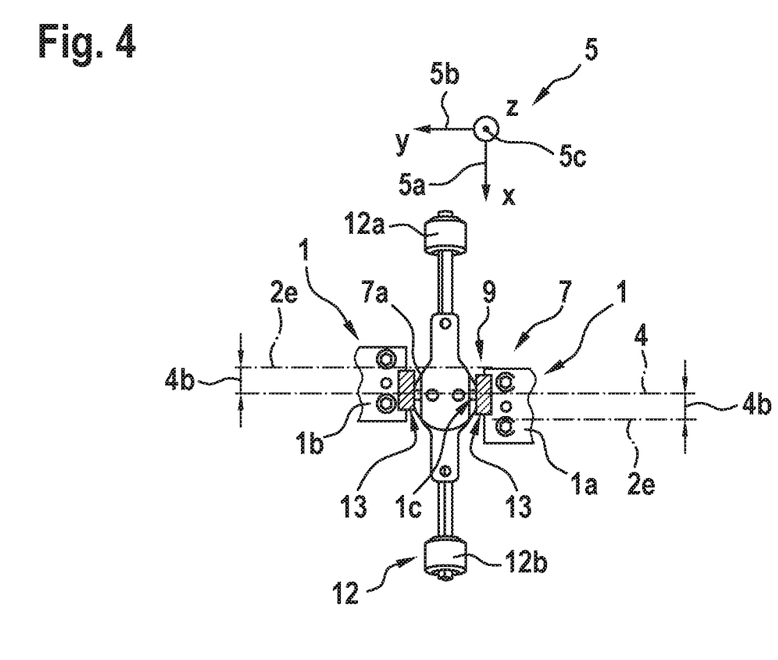
FIG. 4 shows an enlarged detail of the propeller assembly of FIG. 3 with associated bearings.

FIG. 4 shows the propeller assembly 7 of FIG. 3, wherein the advancing and retreating blades 1a, 1b are essentially cut off for simplifying the representation. FIG. 4 illustrates an exemplary mounting of the advancing and retreating blades 1a, 1b to the propeller mast 7a of the propeller assembly 7.

According to one aspect, the associated connection means 1c of FIG. 3 and/or the pitching moment transfer device 9 of FIG. 3 is mounted in a rotatable manner to the propeller mast 7a. This is preferably achieved by structurally connecting the associated connection means 1c and/or the pitching moment transfer device 9 to the propeller mast 7a via suitable bearings 13, such as e. g. ball bearings, friction bearings, plain bearings, etc.

Figure 5:
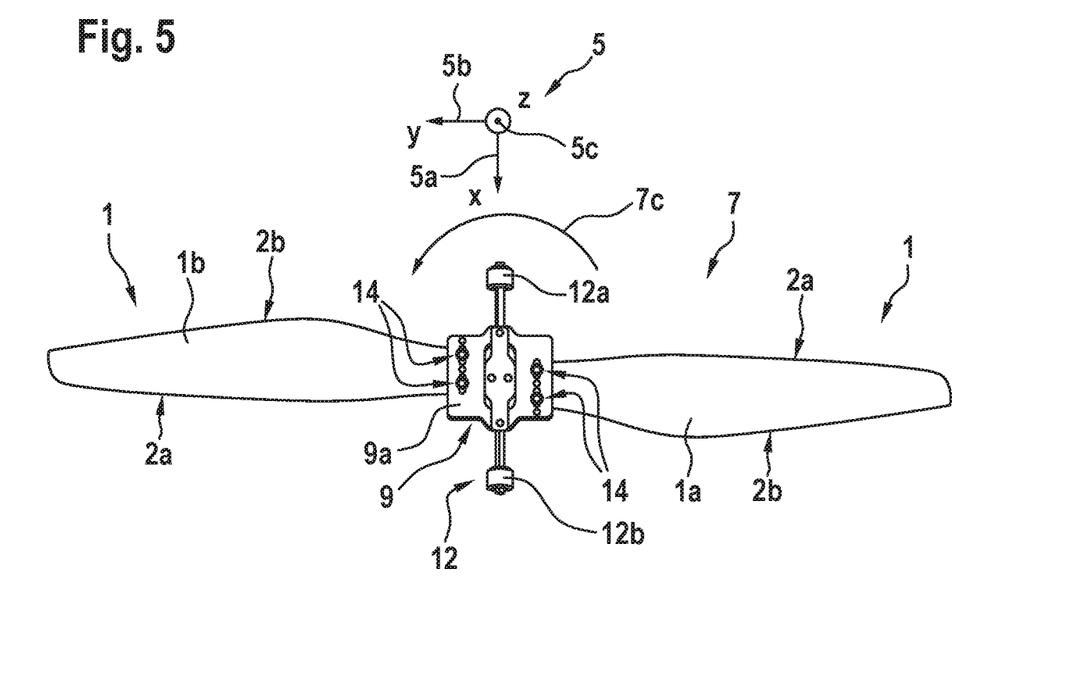
FIG. 5 shows the propeller assembly of FIG. 3 with a pitching moment transfer device.

FIG. 5 shows the propeller assembly 7 of FIG. 2 to FIG. 4 with the advancing and retreating blades 1a, 1b and the pitching moment transfer device 9. The latter preferably defines a rigid link between the advancing and retreating blades 1a, 1b.

According to one aspect, the pitching moment transfer device 9 comprises at least one plate-shaped support 9a that is rigidly mounted to each one of the advancing and retreating blades 1a, 1b. More specifically, the at least one plate-shaped support 9a is preferably connected to the advancing and retreating blades 1a, 1b via suitable attachment means 14, such as e. g. screws, bolts, rivets, glue, etc.

Figure 6:
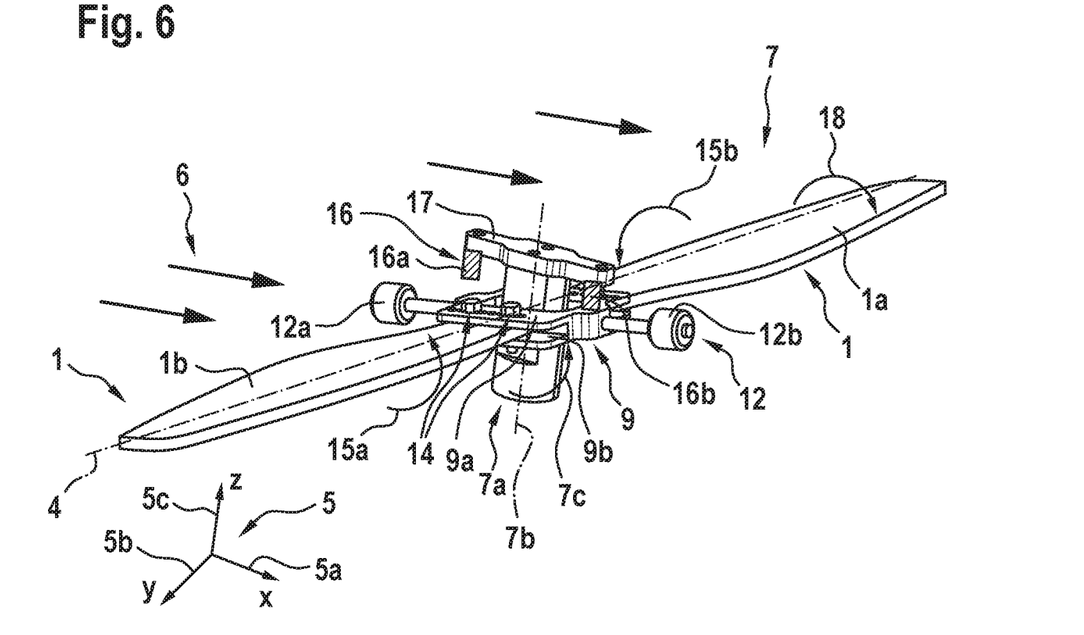
FIG. 6 shows a perspective view of the propeller assembly of FIG. 5 with a rotation limiting device in a non-axial inflow field.

FIG. 6 shows the propeller assembly 7 of FIG. 5 in the non-axial inflow field 6 of FIG. 3, with the advancing and retreating blades 1a, 1b and the pitching moment transfer device 9 of FIG. 5 for further illustrating an exemplary implementation of the latter. FIG. 6 also further illustrates the rigid mounting of the pitching moment transfer device 9 to the advancing and retreating blades 1a, 1b via the attachment means 14.

As described above, the pitching moment transfer device 9 preferably comprises the plate-shaped support 9a and at least one additional plate-shaped support 9b, both of which are preferentially rigidly connected to each other. According to one aspect, the plate-shaped supports 9a, 9b are implemented as a single piece, which is preferably rigidly connected to the rotation damping means 12 of FIG. 3 to FIG. 5, i. e. the bell hiller weights 12a, 12b.

It should be noted that the pitching moment transfer device with the plate-shaped supports 9a, 9b preferably comprises a comparatively high torsional stiffness and is adapted for transfer of moments and inertia. According to one aspect, the pitching moment transfer device 9 can be adapted to replace the rotation damping means 12, i. e. the bell hiller weights 12a, 12b.

As also described above, the pitching moment transfer device 9 operates to increase a respective angle of attack 15a of the retreating blade 1b, while reducing a respective angle of attack 15b of the advancing blade 1a, thus, resulting in a passive pitch adjustment of the advancing and retreating blades 1a, 1b. This passive pitch adjustment is preferably achieved by the cumulated pitch rotation 11 of FIG. 3 of the advancing and retreating blades 1a, 1b around the common pitch axis 4.

However, since the advancing and retreating blades 1a, 1b can freely rotate around the common pitch axis 4, they must be limited in order to guarantee a required aerodynamic performance and safety of operation. Therefore, a rotation limiting device 16 is provided.

More specifically, according to one aspect a rotation limiting device mount 17 is mounted to the propeller mast 7a, and preferentially rigidly attached thereto. Alternatively, the propeller mast 7a and the rotation limiting device mount 17 can be implemented as a single piece.

The rotation limiting device mount 17 is connected to the rotation limiting device 16, which preferably comprises at least two static rotation limiters 16a, 16b. These static rotation limiters 16a, 16b define a maximum allowed angular deflection in negative pitching direction, as indicated by the angles of attack 15a, 15b, as well as a maximum allowed positive angular pitching deflection 18. However, it should be noted that the static rotation limiters 16a, 16b are merely optional, as the rotation damping means 12, i. e. the bell hiller weights 12a, 12b, may also limit pitching deflection of the advancing and retreating blades 1a, 1b via its inertia.

Figure 7:
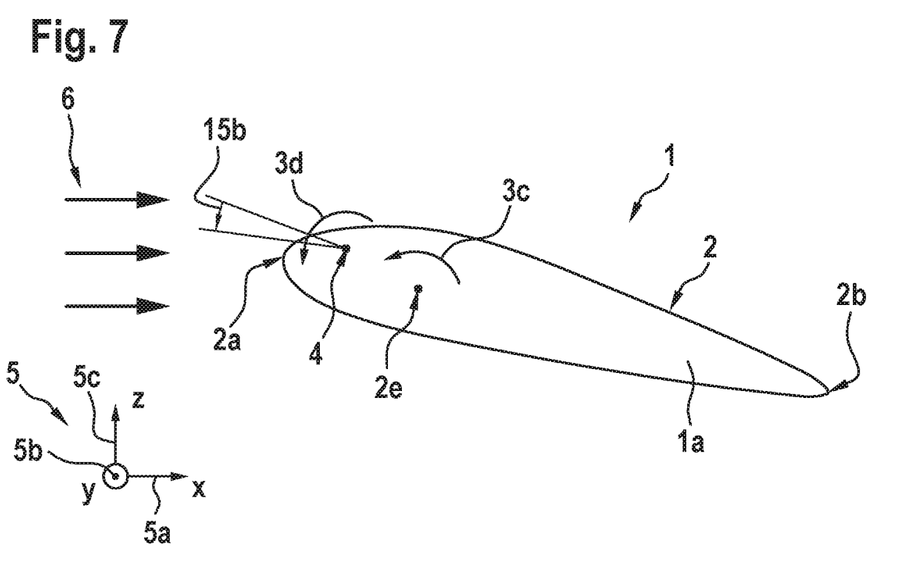
FIG. 7 shows a sectional view of an advancing blade of the propeller assembly of FIG. 6.

FIG. 7 shows the advancing blade 1a of the propeller assembly 7 of FIG. 6 in the non-axial inflow field 6 of FIG. 6. FIG. 7 further illustrates the reduced angle of attack 15b of the advancing blade 1a that is obtained by the passive pitch adjustment of the advancing blade 1a in operation.

Figure 8:
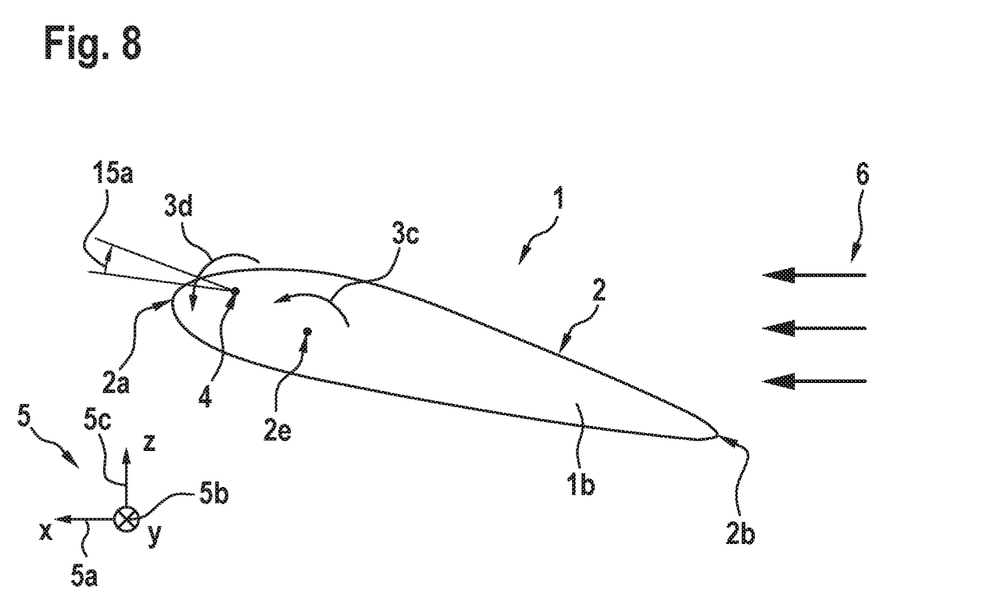
FIG. 8 shows a sectional view of a retreating blade of the propeller assembly of FIG. 6.

FIG. 8 shows the retreating blade 1b of the propeller assembly 7 of FIG. 6 in the non-axial inflow field 6 of FIG. 6. FIG. 8 further illustrates the increased angle of attack 15a of the retreating blade 1b that is obtained by the passive pitch adjustment of the retreating blade 1b in operation.

Figure 9:
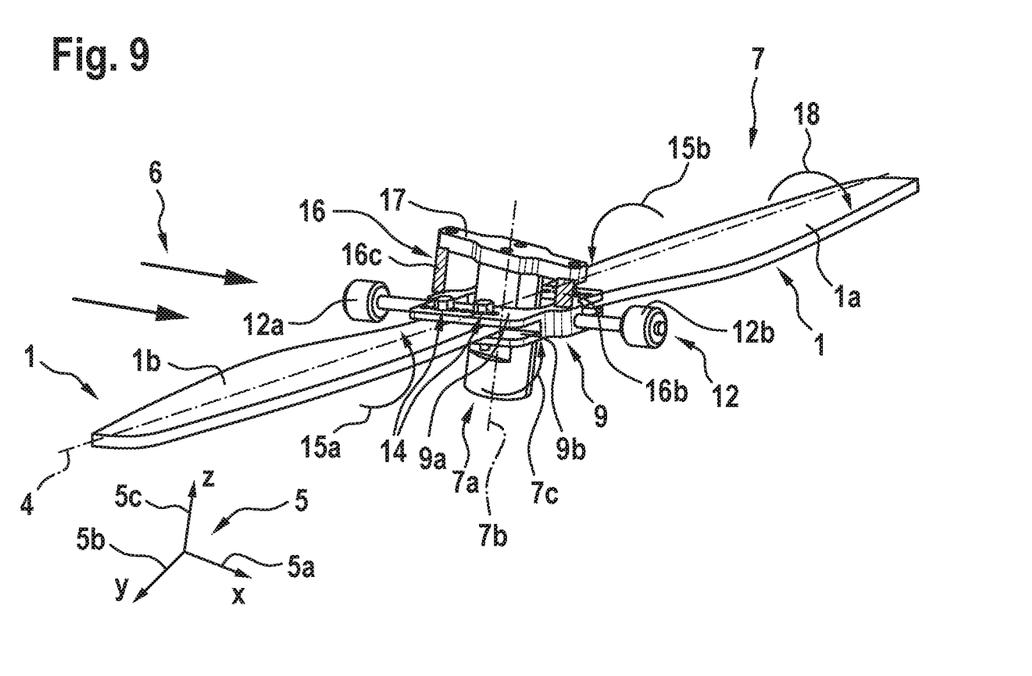
FIG. 9 shows a perspective view of the propeller assembly of FIG. 6 with an alternative rotation limiting device.

FIG. 9 shows the propeller assembly 7 of FIG. 6 with the advancing and retreating blades 1a, 1b, the pitching moment transfer device 9, the rotation limiting device mount 17 and the rotation limiting device 16. However, in contrast to FIG. 6 the rotation limiting device 16 now comprises at least two actuators, i. e. variable rotation limiters 16c, 16d instead of the static rotation limiters 16a, 16b. By using such actuators, i. e. variable rotation limiters 16c, 16d, variable pitching angles can be set. More specifically, the maximum allowed angular deflection in negative pitching direction (15a, 15b in FIG. 6) as well as the maximum allowed positive angular pitching deflection (18 in FIG. 6) can be adapted during flight operation and, thus, to respective flight situations and conditions.

Figure 10:
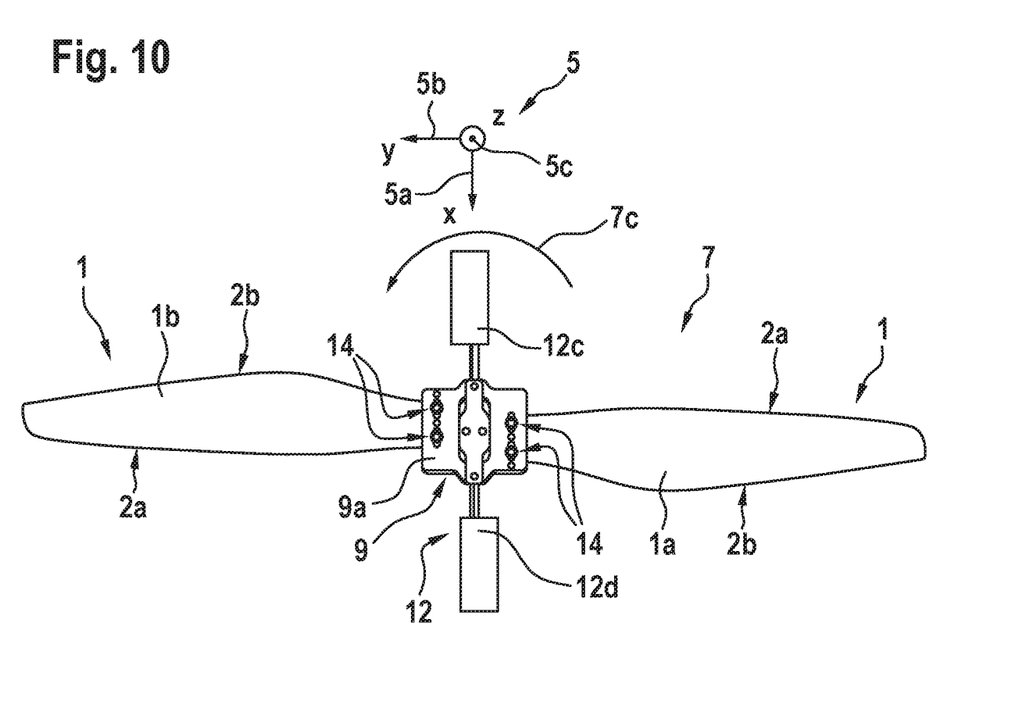
FIG. 10 shows the propeller assembly of FIG. 3 with alternative rotation damping means.

FIG. 10 shows the propeller assembly 7 of FIG. 5 with the advancing and retreating blades 1a, 1b, the pitching moment transfer device 9 and the rotation damping means 12. However, in contrast to FIG. 5 the rotation damping means 12 now comprises instead of the bell hiller weights 12a, 12b at least two aerodynamic paddles 12c, 12d for balancing the propeller assembly 7 aerodynamically.

Figure 11:
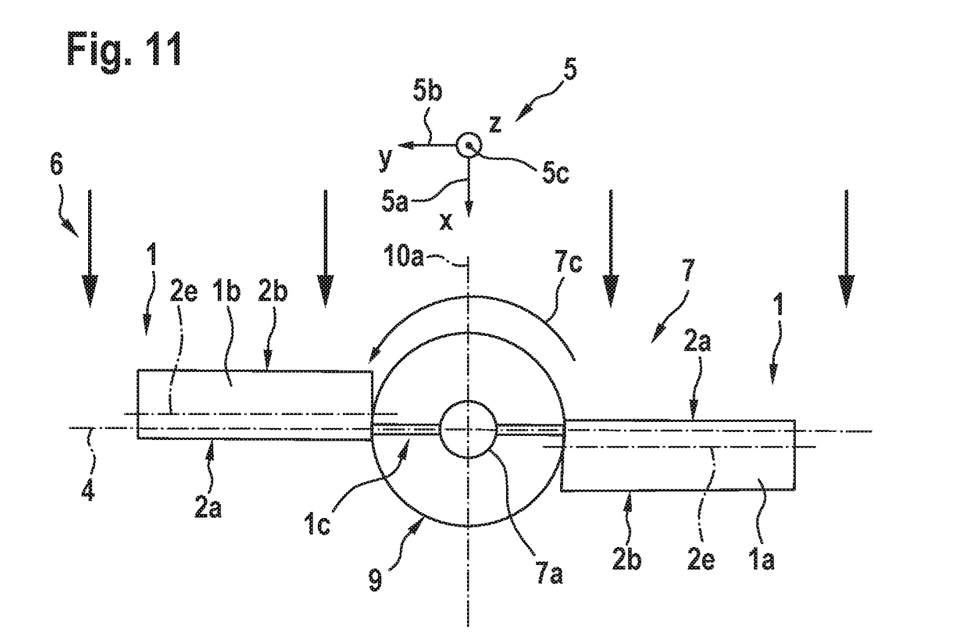
FIG. 11 shows a schematic top view of the propeller assembly of FIG. 5 with an alternative pitching moment transfer device.

FIG. 11 shows the propeller assembly 7 of FIG. 3 with the advancing and retreating blades 1a, 1b, the associated connection means 1c and the pitching moment transfer device 9. As described above, each one of the advancing and retreating blades 1a, 1b has its associated quarter chord line 2e, which has a parallel offset (4b, 4c in FIG. 1) of the common pitch axis 4 that is defined by the associated connection means 1c.

For further illustration of a basic principle of the present invention, the pitching moment transfer device 9 is schematically illustrated as a circle, to which the advancing and retreating blades 1a, 1b are connected. However, it should be noted that the pitching moment device 9, i. e. its plate-shaped supports 9a, 9b of FIG. 6, may naturally be implemented in circular form instead of the rectangular form illustrated in FIG. 6. Likewise, any other shaping, including polygonal and oval, may also be implemented.

Figure 12:
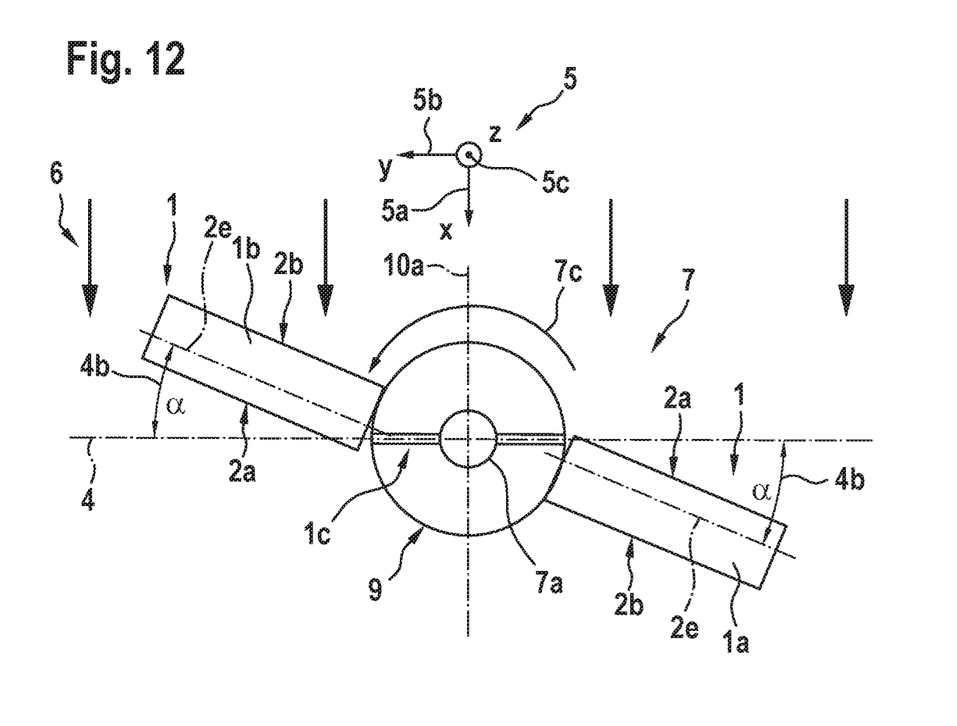
FIG. 12 shows the propeller assembly of FIG. 11 with an alternative propeller arrangement.

FIG. 12 shows the propeller assembly 7 of FIG. 11 with the advancing and retreating blades 1a, 1b, the associated connection means 1c and the pitching moment transfer device 9 that is illustrated as a circle. FIG. 12 illustrates an alternative implementation of the propeller assembly 11, wherein the predetermined offset 4b of FIG. 1 of the common pitch axis 4 relative to the quarter chord line 2e of each one of the advancing and retreating blades 1a, 1b defines an offset angle.

More specifically, the quarter chord line 2e of each one of the advancing and retreating blades 1a, 1b is inclined with a predetermined angle $\alpha$ with respect to the common pitch axis 4. In other words, the horizontal offset Ox, i. e. the offset 4b of FIG. 1, is now defined by the angle $\alpha$.

Figure 13:
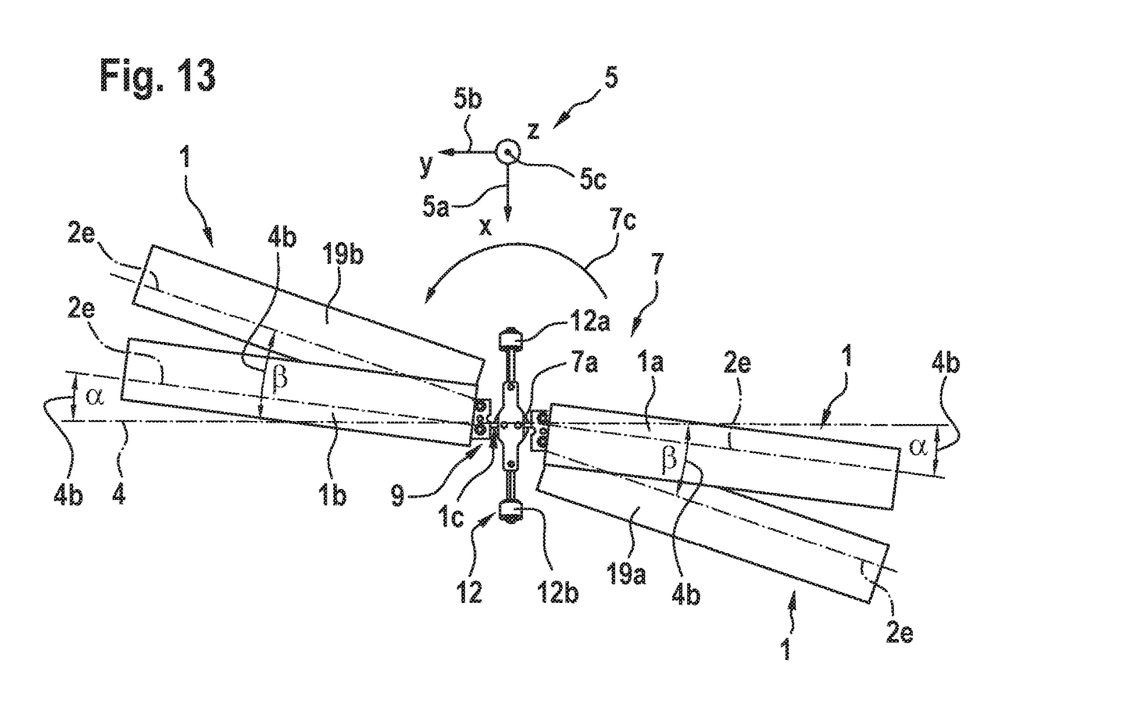
FIG. 13 shows the propeller assembly of FIG. 3 with an alternative propeller arrangement.

FIG. 13 shows the propeller assembly 7 of FIG. 3 with the advancing and retreating blades 1a, 1b, the associated connection means 1c that defines the common pitch axis 4, and the pitching moment transfer device 9. Illustratively, each one of the advancing and retreating blades 1a, 1b has its associated quarter chord line 2e, which is according to FIG. 12 inclined with the predetermined angle $\alpha$ with respect to the common pitch axis 4, i. e. the horizontal offset Ox that defines the offset 4b of FIG. 1 is defined by the angle $\alpha$. However, it should be noted that the horizontal offset Ox that defines the offset 4b of FIG. 1 may alternatively be implemented as shown in FIG. 3, such that the quarter chord lines 2e of the advancing and retreating blades 1a, 1b are arranged in parallel to the common pitch axis 4.

According to one aspect, the propeller assembly 7 now comprises at least one additional propeller blade 1. By way of example, a first additional advancing blade 19a and a first additional retreating blade 19b, both of which are illustrated with their respective quarter chord lines 2e, are provided. Consequently, the associated connection means 1c are adapted for interconnecting at least four propeller blades.

The quarter chord line 2e of each one of the first additional advancing and first additional retreating blades 19a, 19b is preferably inclined with a predetermined angle $\beta$ with respect to the common pitch axis 4. In other words, the horizontal offset Ox, i. e. the offset 4b of FIG. 1, of the quarter chord line 2e of each one of the first additional advancing and first additional retreating blades 19a, 19b is preferentially defined by the angle $\beta$.

Figure 14:
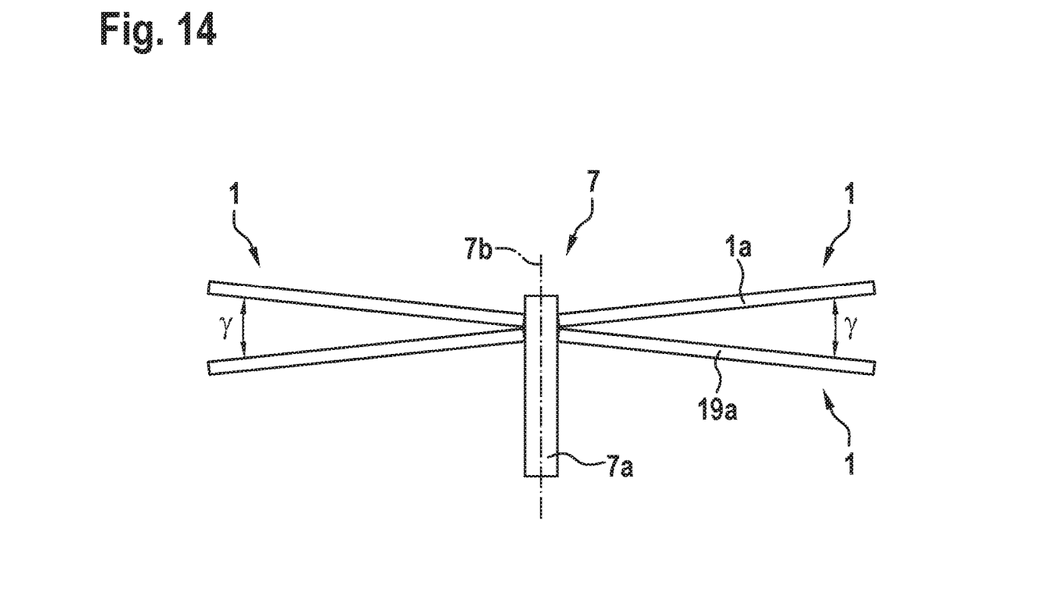
FIG. 14 shows a schematic front view of the propeller assembly of FIG. 13.

FIG. 14 shows the propeller assembly 7 of FIG. 13 with the advancing and retreating blades 1a, 1b and the first additional advancing and retreating blades 19a, 19b, all of which are mounted to the propeller mast 7a of FIG. 13 as described above with reference to the advancing and retreating blades 1a, 1b. According to one aspect, a vertical offset angle $\gamma$ is now implemented between the advancing blade 1a and the first additional advancing blade 19a, and likewise between the retreating blade 1b and the first additional retreating blade 19b. This vertical offset angle $\gamma$ can be implemented in addition to the implementation described above with reference to FIG. 13, or as an alternative thereto.

Figure 15:
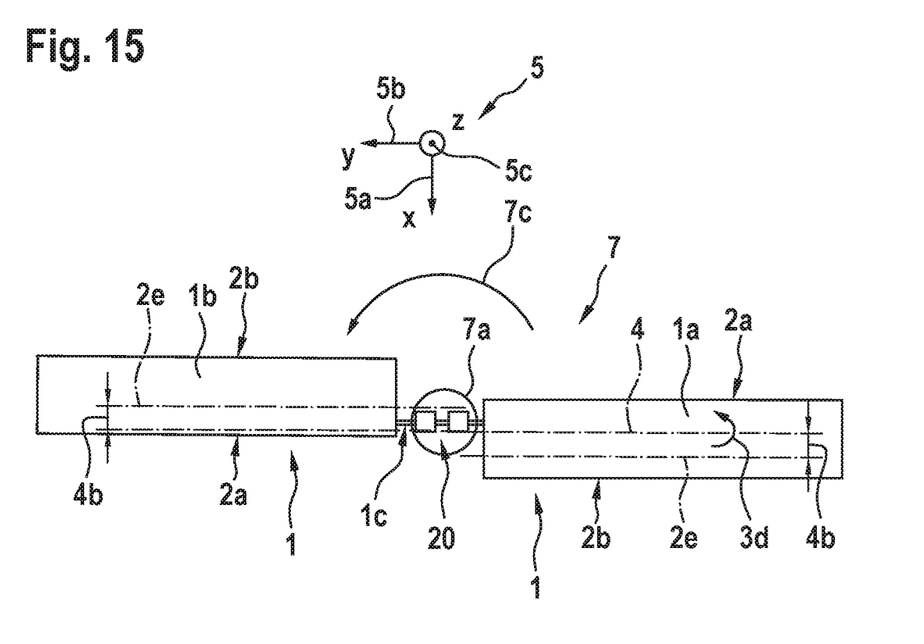
FIG. 15 shows the propeller assembly of FIG. 3 without the rotation damping means.

FIG. 15 shows the propeller assembly 7 of FIG. 3 with the advancing and retreating blades 1a, 1b, the associated connection means 1c that defines the common pitch axis 4, the propeller mast 7a and at least one rotation hinge means 20 according to one aspect. More specifically, the associated connection means 1c preferably intersects the propeller mast 7a. A structural connection between the propeller mast 7a and the associated connection means 1c is preferentially implemented via the at least one rotation hinge means 20, which preferably enables a pitch rotation of the advancing and retreating blades 1a, 1b around the common pitch axis 4, thus, providing a function as damper or feather or a combination of both and/or only via friction means in order to adjust underlying rotation angles.

It should be noted that the arrangement illustrated in FIG. 15 represents a significantly simplified arrangement. More specifically, with respect to the above described arrangements provision of the pitching moment transfer device 9, the rotation damping means 12, the bearings 13 and the rotation limiting device 16 can be omitted.

It should further be noted that modifications to the above described embodiments are within the common knowledge of the person skilled in the art and, thus, also considered as being part of the present invention. For instance, according to FIG. 3 to FIG. 6 described above, the rotation damping means 12 are implemented by means of suitable bell hiller weights 12a, 12b and according to FIG. 10 they are implemented by means of suitable aerodynamic paddles 12c, 12d. However, alternatively respective rotation damping means may be integrated in the bearings 13 of FIG. 4 as part of a torque damping bearing, in the associated connection means 1c of FIG. 2 to FIG. 4 as part of a damping element implemented, e. g. by means of composite, metallic, plastic and/or rubber materials, or in the moment transfer device 9 of FIG. 2 to FIG. 6 as part of a damping element implemented e. g. by means of composite, metallic, plastic and/or rubber materials. Finally, in configurations wherein a kind of a curved quarter chord line as well as a curved leading and trailing edges are provided, which normally is described as a sweep, forward or backward, such as e. g. implemented in a so-called Blue-Edge Blade, the described offset angles can vary in radial direction, in particular if an underlying planform of the propeller blade is not rectangular.

REFERENCE LIST 1 propeller blade
1a advancing propeller blade
1b retreating propeller blade
1c blade connection means
2 airfoil
2a leading edge
2b trailing edge
2c airfoil chord
2d quarter chord distance
2e quarter chord line
3a lift of airfoil
3b drag of airfoil
3c pitching moment of propeller blade at quarter chord line
3d resulting pitching moment of propeller blade
4 propeller blade pitch axis
4a pitch axis to leading edge distance
4b pitch axis to quarter chord line offset
4c pitch axis from quarter chord line z-axis offset
5 airfoil coordinate system
5a x-axis
5b y-axis
5c z-axis
6 free stream direction
7 propeller assembly
7a propeller mast
7b propeller assembly rotation axis
7c propeller assembly rotation direction
8a lift distribution of advancing propeller blade during non-axial inflow 8b lift distribution of retreating propeller blade during non-axial inflow
9 pitching moment transfer device
9a upper plate-shaped support
9b lower plate-shaped support
10 aircraft
10a aircraft longitudinal extension
11 cumulated pitch rotation of blade around pitch axis
12 rotation damping means
12a, 12b bell hiller weights
12c, 12d aerodynamic paddles
13 bearings
14 attachment means
15a increased angle of attack
15b reduced angle of attack
16 rotation limiting device
16a, 16b static rotation limiters
16c, 16d actuators/variable rotation limiters
17 rotation limiting device mount
18 positive angular pitching deflection
19a additional advancing propeller blade
19b additional retreating propeller blade
20 rotation hinge means
α first horizontal offset angle
β second horizontal offset angle
γ vertical offset angle

What is claimed is:

1. A propeller assembly with at least two propeller blades that are interconnected by associated connection means, the associated connection means defining a common pitch axis for the at least two propeller blades in operation, each one of the at least two propeller blades comprising a leading edge and a trailing edges that define a chord and a quarter chord line thereof,
wherein the common pitch axis has an upstream predetermined offset relative to the quarter chord line of each one of the at least two propeller blades, the upstream predetermined offset being in a region defined between the leading edge and the quarter chord line of each one of the at least two propeller blades to produce an additional momentum next to a blade's quarter chord line moment, resulting from a rotation of each one of the at least two propeller blades around the quarter chord line and wherein the associated connection means enables, at least in operation in a non-axial inflow field, a passive pitch adjustment of the at least two propeller blades around the common pitch axis in response to aerodynamic forces acting on the at least two propeller blades.

2. The propeller assembly according to claim 1, wherein at least in operation the passive pitch adjustment homogenizes at least approximately an underlying lift distribution generated by the at least two propeller blades in operation.

3. The propeller assembly according to claim 1, wherein the common pitch axis is arranged at least approximately in parallel to the quarter chord line of each one of the at least two propeller blades.

4. The propeller assembly according to claim 3, wherein further to the upstream predetermined offset, the common pitch axis has a predetermined height offset relative to a height position of the quarter chord line of each one of the at least two propeller blades.

5. The propeller assembly according to claim 1, wherein a pitching moment transfer device is provided, the pitching moment transfer device being adapted to transfer a pitching moment generated on one of the at least two propeller blades during the passive pitch adjustment in operation to the other one of the at least two propeller blades.

6. The propeller assembly according to claim 5, wherein the pitching moment transfer device defines a rigid link between the at least two propeller blades.

7. The propeller assembly according to claim 6, wherein the pitching moment transfer device comprises at least one plate-shaped support that is rigidly mounted to each one of the at least two propeller blades.

8. The propeller assembly according to claim 1, wherein the passive pitch adjustment of the at least two propeller blades in operation is achieved by a rotation of the at least two propeller blades around the common pitch axis, wherein associated rotation damping means are provided for damping the rotation of the at least two propeller blades around the common pitch axis.

9. The propeller assembly according to claim 8, wherein the associated rotation damping means comprises at least one of bell hiller weights and aerodynamic paddles.

10. The propeller assembly according to claim 1, wherein the associated connection means are mounted in a rotatable manner to an associated propeller mast.

11. The propeller assembly according to claim 10, wherein bearings are provided for mounting the associated connection means to the associated propeller mast.

12. The propeller assembly according to claim 1, wherein the predetermined offset of the common pitch axis relative to the quarter chord line of each one of the at least two propeller blades defines an offset angle (α,β).

13. The propeller assembly according to claim 1, wherein the associated connection means are interconnecting at least four propeller blades.

14. An aircraft comprising a propeller assembly according to claim 1.

* * * * *